n-STAGE COUNTER CIRCUIT FOR COUNTING n INPUT PULSES

Filed Dec. 28, 1966 2 Sheets-Sheet 1

Inventor:
Norton W. Bell
By Griffin & Branigan Atty n-STAGE COUNTER CIRCUIT FOR COUNTING n INPUT PULSES Filed Dec. 28, 1966

Inventor:
Norton W. Bell

By Griffin & Branigan Attys

United States Patent Office 3,459,962
Patented Aug. 5, 1969

3,459,962
n-STAGE COUNTER CIRCUIT FOR COUNTING n INPUT PULSES
Norton W. Bell, Pasadena, Calif., assignor to Bell and Howell Company, Chicago, Ill.
Filed Dec. 28, 1966, Ser. No. 605,477
Int. Cl. H03k *21/00, 23/08, 23/14*
U.S. Cl. 307—220 13 Claims

ABSTRACT OF THE DISCLOSURE

There is herein disclosed a multi-stage parallel connected n-stage pulse counter for counting *n* input pulses and wherein each stage includes two bistable circuits. A single input terminal is resistively connected to all of the stages which are themselves resistively interconnected. A reset terminal is also connected to all of the stages each of which is selectively connected to a plurality of output terminals. The resistive connections between the stages are such that a pulse which turns on a prior stage also sets up the subsequent stage to be turned on by the next pulse.

Counter circuits are well known and widely used in electronic systems. For example, they are used to count digital pulse signals as an aid in the performance of mathematical computations. Further, they are used in electronic control systems to control the operation of machines. That is, they are used to count the pulses on tapes or cards to control a machine's operation in accordance with the number of the pulses counted. Alternatively, the location of the pulses on the card or along the length of the tape may determine the machine's operations.

Most prior art counters are serial counters; that is, they comprise a plurality of serially connected counter stages. In one such counter, a pulse applied to the first stage triggers it on, causing it to generate an output signal. The second pulse turns off the first stage and turns on the second stage. The third pulse turns on the first stage while leaving the second stage on. And, the fourth pulse turns off the first and second stages and turns on the third stage. This on-off operation occurs for each input pulse. After all of the pulses have been received, a read-out from each stage indicates the total number of pulses received. While these types of devices have found widespread use, their operation has not proven to be entirely satisfactory in all environments. For example, if the counter is to be used to control the operation of a machine, it is desirable for the first pulse to trigger on the first stage to cause a particular machine operation. It is also desirable for the second pulse to turn on the second stage to cause a second machine operation while leaving the first stage on. And it is desirable for the third pulse to trigger on the third stage while leaving the first and second stages on. That is, the first pulse may start the machine; the second pulse may cause a particular operation; and the third pulse may cause a sub-operation. The existence of a fourth pulse or its nonexistence may determine whether a second sub-operation is performed. Hence, it is an object of this invention to provide a new and improved counter that is suitable for use in controlling a machine in this manner; i.e., the sequential energizing of counter stages in accordance with the sequential receipt of pulses while leaving prior stages energized until reset.

It is a further object of this invention to provide a new and improved counter circuit wherein the first pulse triggers on the first stage of the counter, the second pulse triggers on the second stage of the counter, and the *n*th pulse triggers on the *n*th stage of the counter.

It is a still further object of this invention to provide a new and improved counter that is simple, uncomplicated, and suitable for use to control machine functions.

Because of the danger of high voltage, the invention preferably uses transistor circuits; and because of the desirability of a wider than normal transistor voltage swing, the invention uses opposite conductivity transistors. That is, it has been found desirable to operate with a bilateral pulse (positive to negative or vice versa) as opposed to a unilateral pulse (positive or negative). In this manner, a larger voltage change operates the counter circuit; however, the voltage above or below zero is small to eliminate high voltage danger. Low voltage also permits cheaper construction since the amount of costly shielding and insulation can be reduced.

Therefore, it is a still further object of this invention to provide a new and improved transistorized counter circuit that is operated by a bilateral pulse.

In accordance with a principle of the invention, a plurality of transistorized counter stages are connected in parallel. Each stage includes a pair of NPN transistors and a pair of PNP transistors. Each pair of transistors is connected in a feedback arrangement so that one transistor is on and the other is off prior to a voltage change being applied. Further, the transistors are connected so that a voltage rise changes the states of NPN transistors and a voltage drop changes the states of the PNP transistors. In addition, the stages are interconnected such that the first voltage rise-fall only triggers the first stage's transistors. However, triggering the first stage "sets up" the second stage so that it is triggered by the second voltage rise-fall. In this manner, consecutive stages are turned on by consecutive voltage rise-fall occurences.

In accordance with a further principle of the invention, the voltage rise-fall is a change from a negative voltage to a positive voltage condition for the voltage rise; and is a change from a positive voltage condition to a negative voltage condition for a voltage drop. That is, the input signal is a bilateral pulse that goes from negative to positive and then from positive to negative, as opposed to a conventional system wherein the voltage goes from zero to a positive or negative voltage condition and then returns to zero.

It should be particularly appreciated that while most prior art counters are responsive to the rate of change of the input voltage, the counter of the invention is not responsive to the rate of input voltage change. Rather, the counter of the invention is responsive to the amount of change regardless of the time interval during the change occurred. This feature is advantageous when it is desired to count input pulses irrespective of the time rate of change.

When a machine is being tested, for example, it is frequently desirable to run it through an extremely slow machine cycle such as by hand or by means of a suitable jogging circuit. In such a case the counted pulses may rise very slowly indeed whereby the conventional counter's stages are not actuated. This particular advantage of the invention is obtained in large part by the use of conductive or resistive coupling, that is couplings that conduct or pass D.C. are used both between the circuit's input and the stages as well as between the various stages.

Further, because of the bilateral operation of the invention, it is insensitive to large noise signals. That is, the invention operates on the reception of a bilateral pulse of predetermined voltage values and these values are sufficiently large to prevent noise from causing a false output. Moreover, because the signal must both rise and fall to a predetermined level, spurious noise signals that may be superimposed on a desired input signal do not undesirably affect the circuit of the invention.

It will also be appreciated that the invention is a simple device for counting pulses and generating a plurality of output signals in accordance with the number of pulses counted. A plurality of parallel counter stages are connected in such a manner that the first pulse triggers the first stage on; the second pulse triggers the second stage on; and so on. Ultimately, therefore, *n* pulses trigger on *n* stages to generate *n* output signals.

The foregoing objects and many of the attendant advantages of this invention will become more readily appreciated as the same becomes better understood by reference to the following detailed description when taken in conjunction with the accompanying drawings wherein.

Figure 1:
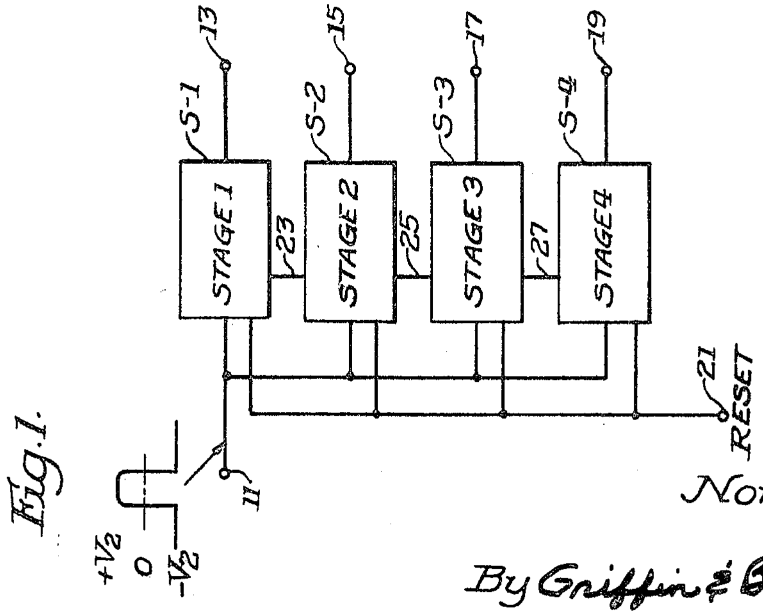
FIG. 1 is a block diagram of the counter of the invention to illustrate the parallel staging concept.

FIG. 1 is a block diagram of a plurality of counter stages connected in accordance with the invention. The system illustrated in FIG. 1 comprises four stages designated S–1, S–2, S–3, and S–4, respectively. The bilateral pulse input is applied to a terminal 11 which is connected to the inputs of each of the stages S–1 through S–4. S–1 is connected to a first output terminal 13; S–2 is connected to a second output terminal 15; S–3 to a third outterminal 17; and S–4 is connected to a fourth output terminal 19. Reset pulses are applied to a reset terminal 21; and the reset terminal is connected to the reset inputs of S–1, S–2, S–3, and S–4. In addition, S–1 has a "set up" output line 23 connected to S–2; S–2 has a "set up" output line 25 connected to S–3; and S–3 has a "set up" output line 27 connected to S–4.

In operation, a first trigger pulse applied to the input terminal 11 triggers S–1 on to generate an output at terminal 13. The first trigger pulse also causes S–1 to generate a signal on line 23 which "sets up" S–2 for the second pulse. That is, the second pulse has no effect on S–1 but triggers S–2 on to cause it to generate an output at terminal 15. The operation of S–2 also creates a signal on "set up" line 25 which sets up S–3 for the third pulse. The third pulse turns on S–3 to generate an output signal at terminal 17 and a "set up" signal on line 27. The fourth pulse triggers on S–4 to generate an output signal at terminal 19.

The occurrence of a reset pulse at terminal 21 resets all of the stages. However, if only one, two, or three pulses have occurred prior to a reset pulse, then only S–1, S–2, or S–3 are reset (as determined by the number of pulses). That is, when the reset pulse occurs, it resets all stages that are on.

It will be appreciated that the block diagram illustrated in FIG. 1 is a simple apparatus for providing a plurality of parallely-connected counter stages wherein each consecutive input pulse triggers on a consecutive stage of the counter.

Figure 2:
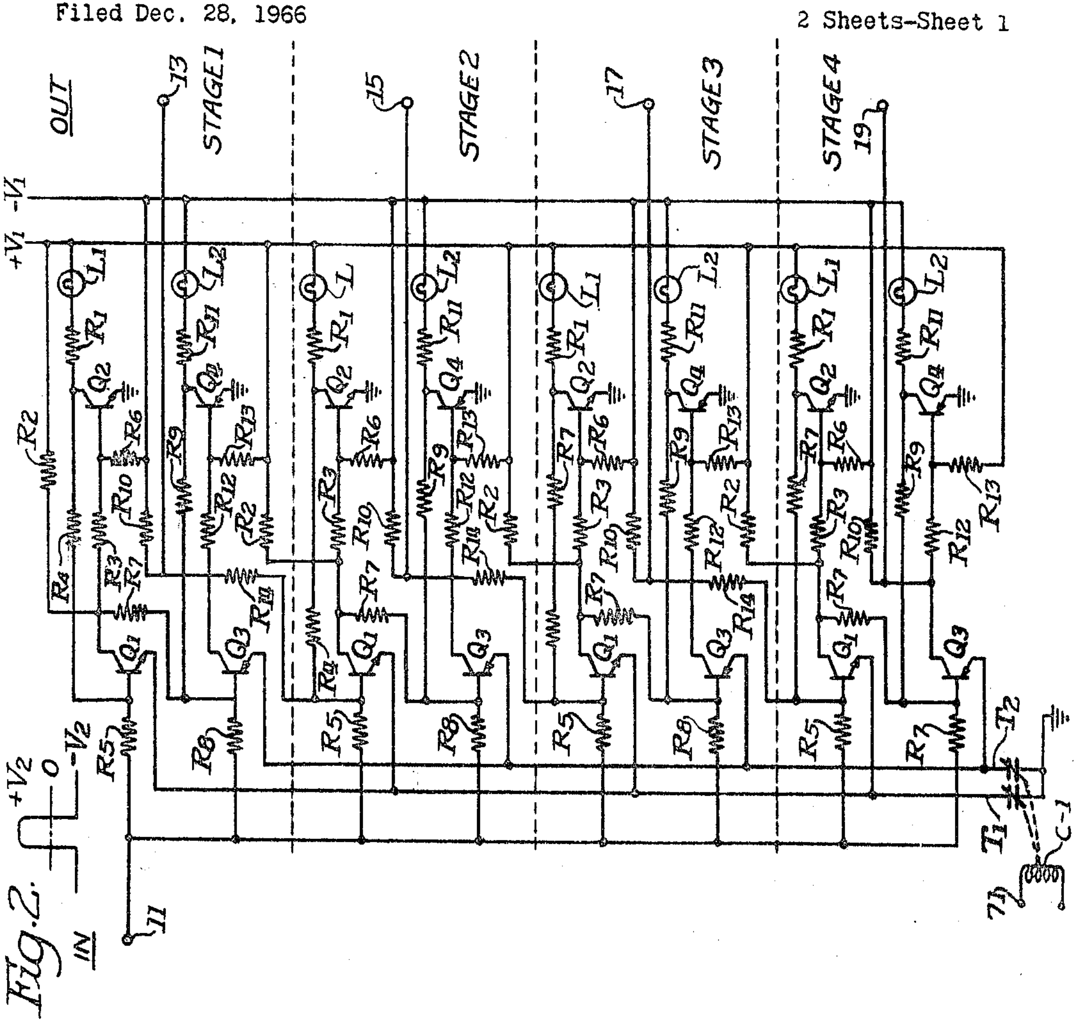
FIG. 2 is a schematic diagram of a four-stage counter made in accordance with the invention.

FIG. 2 is a schematic diagram of a transistorized four-stage counter made in accordance with the invention. Each stage of the counter illustrated in FIG. 2 includes two NPN transistors, two PNP transistors, thirteen resistors, and two lights. In addition, a fourteenth resistor is illustrated as connected between the first and second, second and third, and third and fourth stages. The NPN transistors are illustrated as Q–1 and Q–2, respectively; the PNP transistors are illustrated as Q–3 and Q–4, respectively; the thirteen resistors are illustrated as R–1 through R–13, respectively; the first and second lights are illustrated as L–1 and L–2, respectively; and the fourteenth resistor is illustrated as R–14. In addition, the system illustrated in FIG. 2 includes a solenoid having a coil and a pair of contacts. The coil is illustrated as C–1 and the contacts are illustrated as T–1 and T–2. The contacts are normally closed.

For each stage, R–1 is connected in series with L–1 between the collector of Q–2 and a positive voltage source +V1. R–2 is connected between +V1 and the collector of Q–1; R–3 is connected between the collector of Q–1 and the base of Q–2; R–4 is connected between the collector of Q–2 and the base of Q–1. R–6 is connected between the base of Q–2 and a negative voltage source —V1. R–7 is connected between the collector of Q–1 and the base of Q–3; R–8 is connected between terminal 11 and the base of Q–3; R–9 is connected between the collector of Q–4 and the base of Q–3; and R–10 is connected between —V1 and the collector of Q–3. R–11 is connected in series with L–2 between the collector of Q–4 and —V1. R–12 is connected between the collector of Q–3 and the base of Q–4 and R–13 is connected between the base of Q–4 and +V1. The emitters of Q–2 and Q–4 are grounded. The emitter of Q–1 is connected through contacts T–1 to ground and the emitter of Q–3 is connected through contacts T–2 to ground. R–14 is connected between the collector of Q–3 of one stage and the base of Q–1 of a subsequent stage. One side of coil C–1 is grounded and the other side is connected to terminal 21.

The collector of Q–3 of the first stage is connected to the first output terminal 13; the collector Q–3 of the second stage is connected to the second output terminal 15; the collector of Q–3 of the third stage is connected to the third output terminal 17; and the collector of Q–3 of the fourth stage is connected to the fourth output terminal 19.

For the embodiment of the invention illustrated in FIG. 2, the quiescent input voltage is negative —V2. When a pulse occurs, the voltage goes from —V2 to +V2. Prior to a pulse being applied to the system, transistors Q–2 and Q–4 of each stage are on and transistors Q–1 and Q–3 of each stage are off. That is, the negative input signal to the base of Q–1 biases it off, thereby maintaining its collector at a high positive voltage. The high positive voltage at the collector of Q–1 turns Q–2 on and turns Q–3 off. When Q–3 is off, it has a high negative voltage at its collector, which turns on Q–4. Hence, prior to the occurrence of a pulse, Q–1 and Q–3 are off and Q–2 and Q–4 are on.

Upon the occurrence of the rise from —V2 to +V2 of the first pulse, transistor Q–1 is turned on; that is, its base voltage rise from negative to positive to turn it on. Turning on Q–1 drops its collector voltage to near ground potential thereby turning Q–2 off. Even though Q–1's collector voltage drops to 0, Q–3 does not turn on because the input signal is +V2. However, when the input pulse drops from +V2 to —V2, Q–3 is triggered on. Turning on Q–3 drives its collector to near ground to turn off Q–4. Hence, after a full pulse has occurred, transistors Q–1 and Q–3 are on and transistors Q–2 and Q–4 are off; and when transistor Q–3 is on, an output signal exists at the stage one output terminal 13.

The second stage Q–1 cannot switch from its off state to its on state when the first pulse rise occurs because at this time of the initial voltage rise Q–3 of the first stage was off. Because Q–3 of stage one was off, its collector voltage was high negative (near —V1) and the rise in input voltage to the base of Q–1 of the second stage was insufficient to offset Q–3's high collector voltage. In this manner, the second and subsequent stages were biased off when the first pulse occurred. However, after stage one has been turned on, Q–3 of stage one is on, thereby reducing its collector voltage to a low level to make Q–1 of stage two susceptible to the pulse rise of the second pulse. Hence, the rise of the second pulse triggers Q–1 of stage two on and Q–2 off, so that the drop of the second pulse triggers Q–3 on and Q–4 off. Consequently, after the second pulse has occurred, there is an output signal at both the first and the second stage's output terminal 13 and 15. In this manner, the first, second, third, and fourth stages are sequentially shifted from their on states when four sequential input pulses occur prior to the occurrence of a reset pulse.

To reset the counter, the coil C-1 must be energized to open the contacts T-1 and T-2 and disconnect the emitters of transistors Q-1 and Q-3 of each stage from ground. The disconnecting of these transistors from ground turns them off and turns transistors Q-2 and Q-4 of each stage on. Hence, the counter is in a reset condition.

It should be particularly appreciated that the above described use of resistance coupling means makes all signal paths of the counting circuit of FIG. 2 responsive to slowly varying D.C. signals. Hence, the circuit is responsive to input pulse level changes, not the rate of an input pulse's voltage change.

Figure 3:
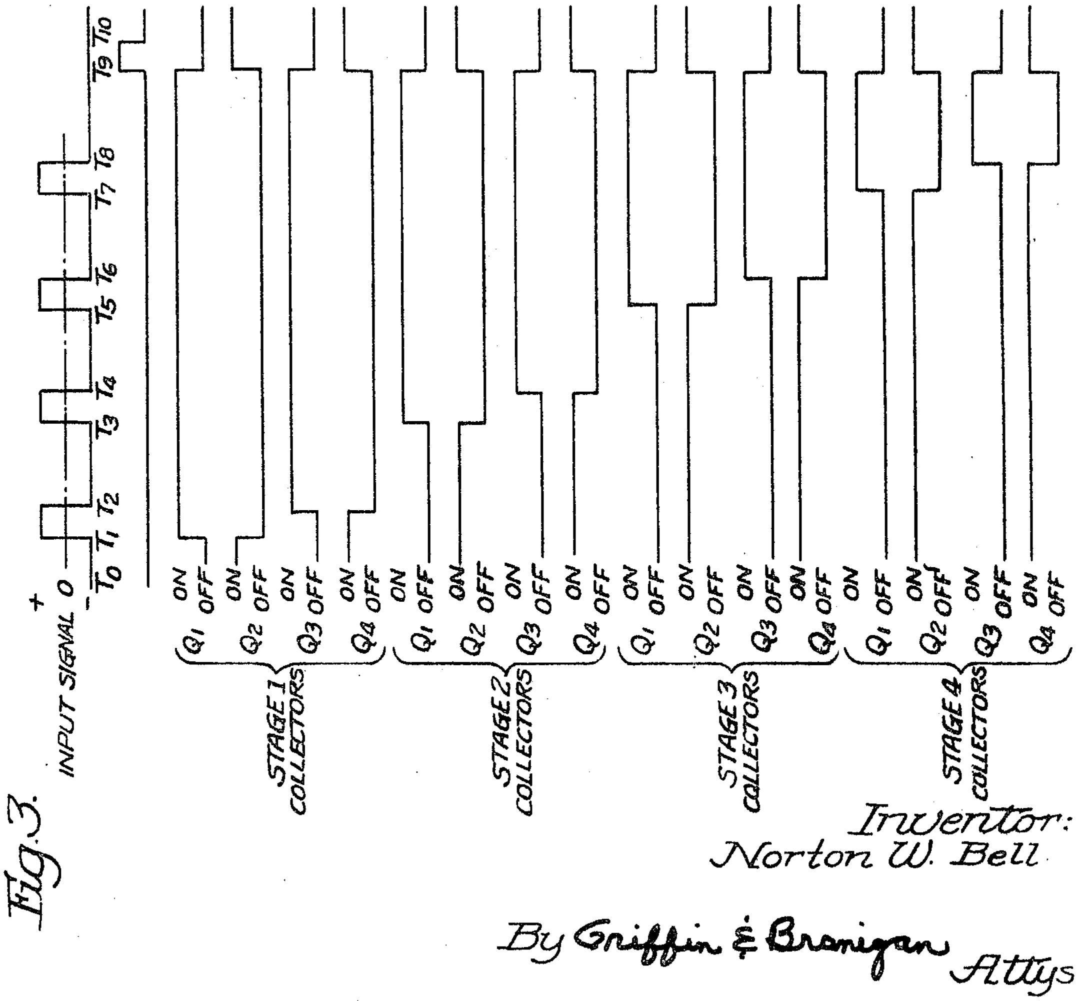
FIG. 3 is a timing diagram for the transistors of the four-stage counter illustrated in FIG. 2.

FIG. 3 is a timing diagram illustrating time-wise the switching of the four stages illustrate in FIG. 2. At time T-0 all of the stages are in their reset condition. That is, all Q-1's are off, all Q-2's are on, all Q-3's are off, and all Q-4's are on. At time T-1, the first pulse rise occurs; this rise switches Q-1 on and turns Q-2 off. At time T-2, the first input pulse drop occurs; this pulse drop switches Q-3 on and Q-4 off. Hence, at time T-2, Q-1 and Q-3 are on; and Q-2 and Q-4 of the first stage are off; and stage one has an output.

At time T-3 the rise of the second pulse occurs and Q-1 is switched on. At the same time, Q-2 is switched off. At time T-4 the drop of the second pulse occurs, switching Q-3 of the second stage on and Q-4 of the second stage off. Similarly, at time T-5 the third pulse rise occurs to switch Q-1 of the third stage on and Q-2 of the third stage off. At time T-6, the drop of the third pulse occurs to switch Q-3 and Q-4 of the third stage on and off, respectively. Finally, at time T-7, the fourth pulse rise occurs to switch Q-1 and Q-2 of the fourth stage on and off, respectively. And, at time T-8, the drop of the fourth pulse occurs to switch Q-3 of the fourth stage on and Q-4 of the fourth stage off.

At time T-9, a reset pulse occurs to reset the stages to their T-0 condition. It will be appreciated that the reset pulse could occur at any time during the four-input pulse chain and that the counter would be reset at that time. Hence, the counter does not have to receive four pulses prior to its being reset.

Figure 4:
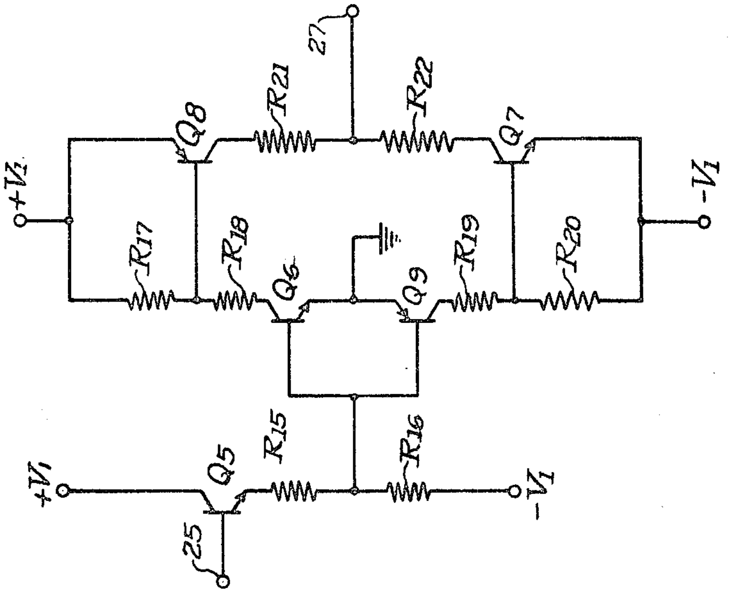
FIG. 4 is a schematic diagram of a driver circuit that generates a bilateral voltage signal suitable for operation of the circuit illustrated in FIG. 2.

FIG. 4 illustrates a driving circuit that provides a bilateral pulse for driving the counter illustrated in FIG. 2. The circuit illustrated in FIG. 4 comprises three NPN transistors and two PNP transistors as well as eight resistors. The three NPN transistors are designated as Q-5, Q-6, and Q-7, repectively. The two PNP transistors are designated as Q-8 and Q-9. The eight resistors are designated as R-15 through R-22.

The base of Q-5 is connected to an input terminal 23; the collector of Q-5 is connected to a +V1 voltage source and the emitter of Q-5 is connected to a —V1 source through series-connected resistors R-15 and R-16. The junction between R-15 and R-16 is connected to the bases of both Q-6 and Q-9. The collector of Q-6 is connected to +V1 through series connected resistors R-17 and R-18 and the collector of Q-9 is connected to —V1 through series connected resistors R-19 and R-20. The emitters of Q-6 and Q-9 are connected together and to ground. The junction between R-17 and R-18 is connected to the base of Q-8; the emitter of Q-8 is connected to +V1; and the collector Q-8 is connected to the collector of Q-7 through the series combination of R-21 and R-22. The junction between R-19 and R-20 is connected to the base of Q-7 and the emitter of Q-7 is connected to —V1. Finally, the junction between R-21 and R-22 is connected to an output terminal 27 that is adapted for connection to the input 11 of the counter.

In operation, when Q-5 is off Q-6 and Q-8 are off, while Q-7 and Q-9 are on. Hence, the output is a negative voltage that flows from —V1 through Q-7. This negative voltage is the normal quiescent level of the input to the counter. When a pulse is applied to the input of Q-5, it is turned on. Turning Q-5 on turns Q-9 off and Q-6 on. Turning off Q-9 turns off Q-7 and turning on Q-6 turns on Q-8. Hence, when a pulse is applied to Q-5, the output from the drive circuit of FIG. 4 goes from negative to positive. When the input to Q-5 drops back to 0, Q-5 turns off, thereby turning Q-6 and Q-8 off and Q-7 and Q-9 on to drop the output to the quiescent negative V2 condition. In this manner, a negative to positive bilevel signal suitable for driving the counter circuit illustrated in FIG. 2 is provided.

The input to Q-5 may be connected to any conventional pulse source such as a card-reader, for example. More specifically, Q-5 could be connected to the output of a photodetector in a light-reflective, optical card-reading device. Each time a mark passes between the photodetector and the light, an output pulse is applied to Q-5. These pulses operate the driver circuit of FIG. 4 to generate a bilateral, bilevel voltage that will trigger the counter of FIG. 2 in the manner hereinabove described.

It will be appreciated that the foregoing has described a simple counter circuit. The input to the counter is a bilateral, bilevel signal that sequentially shifts the counter stages from an off output condition to an on output condition as pulses are applied to the device. All of the stages of the counter are connected in parallel and when one stage is turned on, it sets up the next stage to be subsequently turned only by the next pulse. While a four stage counter has been described it is to be understood that this is merely by way of example and that any number of stages can be used when connected in the manner hereinabove taught.

While the foregoing has described a preferred embodiment of the invention, it will be appreciated by those skilled in the art and others that other similar apparatus can be utilized to carry out the invention. That is, the transistors could be shifted between the NPN and PNP locations. In that manner, the quiescent level of the system would be a plus voltage and would drop to a minus voltage to initially trigger the first two transistors and a rise would then trigger the second two transistors. That is, if Q-1 and Q-2 were PNP transistors and Q-3 and Q-4 were NPN transistors, then the initial drop of the voltage would trigger Q-1 on and Q-2 off and the rise would trigger Q-3 on and Q-4 off and provide an output signal from a stage. Further, the transistors of the driver circuit of FIG. 4 would merely have to be inverted. Hence, the invention may be practiced otherwise than as specifically described herein.

The embodiments of the invention in which an exclusive property or privilege is claimed are defined as follows:

1. A counter for counting *n* input pulses comprising:
a plurality of *n* parallel-connected counting stage, each stage including two bistable circuits, one bistable circuit operated by a voltage rise and the other operated by a voltage fall;
a plurality of output terminals selectively connected to each stage;
a single input terminal, said input terminal resistively connected to all of said stages to simultaneously apply pulses to all of said stages, said simultaneous pulses turning on subsequent stages without turning off prior stages;
a reset terminal, said reset terminal connected to all of said stages; and
resistance means connecting each stage to its subsequent stage so that a pulse that triggers on the prior stage sets up the subsequent stage to be triggered on by the next pulse.

2. Apparatus as claimed in claim 1 wherein *n* equals 4.

3. Apparatus according to claim 1 wherein one of said bistable circuits includes a pair of transistors of one type and the second of said bistable circuits includes a pair of transistors of a second type.

4. Apparatus as claimed in claim 3 wherein said two transistors of one type are NPN transistors and said two transistors of a second type are PNP transistors.

5. Apparatus as claimed in claim 4 including a positive voltage source and a negative voltage source.

6. Apparatus as claimed in claim 5 including in each stage:

first means for connecting the base of one of said NPN and the base of one of said PNP transistors to said input terminal;

second means for connecting the collector of said first NPN transistor to said positive voltage source, to the base of the second NPN transistor, and to the base of the first PNP transistor;

third means for connecting the collector of said second NPN transistor to said positive voltage source and to the base of said first NPN transistor;

fourth means for connecting the base of said second NPN transistor to said negative voltage source;

fifth means for connecting the collector of said first PNP transistor to the base of the second PNP transistor and to said negative voltage source;

sixth means for connecting the collector of said second PNP transistor to the base of said first PNP transistor and to said negative voltage source; and seventh means for connecting the base of said second PNP transistor to said positive voltage source.

7. Apparatus as claimed in claim 6 wherein said means for connecting each stage to its subsequent stage is a resistor means connected between the collector of said first PNP transistor of the stage and the base of the first NPN transistor of the subsequent stage.

8. Apparatus as claimed in claim 5 including in each stage:

a pair of lamps;

a first resistor connected in series with said first lamp between said positive voltage source and the collector of one of said NPN transistors;

a second resistor connected between the collector of the second of said NPN transistors and said positive voltage source;

a fourth transistor connected between the collector of said second of said NPN transistors and the base of said first of said NPN transistors;

a fifth resistor connected between said input terminal and said second NPN transistor;

a sixth resistor connected between the base of said first NPN transistor and said negative voltage source;

a seventh resistor connected between the collector of said second NPN transistor and said input terminal;

a ninth resistor connected between the collector of said second PNP transistor and the base of said first PNP transistor;

a tenth resistor connected between said negative voltage source and the collector of said first PNP transistor;

an eleventh resistor connected in series with said second lamp between the collector of said second PNP transistor and said negative voltage source;

a twelfth resistor connected between the base of said second PNP transistor and the collector of said first PNP transistor; and a thirteenth resistor connected between the base of said second PNP transistor and said positive voltage source.

9. Apparatus as claimed in claim 8 wherein said means for connecting each stage to its subsequent stage is a fourteenth transistor connected between the collector of the first PNP transistor of the stage and the base of the second NPN transistor of the subsequent stage.

10. Apparatus as claimed in claim 9 wherein the output terminal of each stage is connected to the collector of the first PNP transistor of the stage.

11. Apparatus as claimed in claim 10, including a solenoid having two sets of contacts wherein the coil of said solenoid is connected to said reset terminal and one set of contacts of said solenoid are connected between the emitter of said second NPN transistor of each stage and ground and the second set of contacts of said coil are connected between the emitter of said first PNP transistor of each stage and ground.

12. Apparatus as claimed in claim 11 including a circuit for driving said counter stages, said circuit including:

fifteen and sixteen resistors connected in series;

a fifth transistor having its base adapted to receive an input pulse, its collector connected to said positive voltage source and its emitter connected through said fifteenth and sixteenth series connected resistors to a negative voltage source;

a sixth transistor and a ninth transistor, the bases of said sixth and ninth transistors connected to the junction between said fifteenth and sixteenth resistors and the emitter of said sixth and ninth transistors connected together and to ground;

seventeenth and eighteenth resistors connected in series, the collector of said sixth resistor connected through seventeenth and eighteenth series-connected resistors to said positive voltage source;

nineteenth and twentieth resistors to said negative voltage source;

a seventh transistor having its base connected to the junction between said nineteenth and twentieth resistors and its emitter connected to said negative voltage source;

an eighth transistor having its base connected to the junction between said seventeenth and eighteenth resistors and its emitter connected to said positive voltage source; and twenty-first and twenty-second resistors connected in series between the collectors of said seventh and said eighth transistors, the junction between said twenty-first and twenty-second resistors connected to the input terminal of said counter.

13. Apparatus as claimed in claim 12 wherein said fifth, sixth, and seventh transistors are NPN transistors and said eighth and ninth transistors are PNP transistors.

References Cited

UNITED STATES PATENTS

| | | | |
|---|---|---|---|
| 2,436,963 | 3/1948 | Grosdoff. | |
| 2,820,153 | 1/1958 | Woll | 307—225 |
| 2,948,820 | 8/1960 | Bothwell | 307—288 X |
| 3,021,450 | 2/1962 | Jiu. | |
| 3,227,965 | 1/1966 | Madsen et al. | 307—288 X |
| 3,268,738 | 8/1966 | Deavenport | 307—288 X |
| 3,297,950 | 1/1967 | Lee | 307—224 X |

JOHN S. HEYMAN, Primary Examiner

U.S. Cl. X.R.

307—288, 291